United States Patent [19]
Hayakawa

[11] Patent Number: 5,206,556
[45] Date of Patent: * Apr. 27, 1993

[54] FIELD MAGNET FOR MINIATURE MOTORS

[75] Inventor: Shotaro Hayakawa, Matsudo, Japan

[73] Assignee: Mabuchi Motor Co., Ltd., Japan

[*] Notice: The portion of the term of this patent subsequent to Nov. 10, 2009 has been disclaimed.

[21] Appl. No.: 663,097

[22] Filed: Mar. 1, 1991

Related U.S. Application Data

[63] Continuation-in-part of Ser. No. 572,001, Aug. 23, 1990, Pat. No. 5,162,684.

[30] Foreign Application Priority Data

Aug. 29, 1989 [JP] Japan .................. 1-100895

[51] Int. Cl.$^5$ .......................... H02K 21/26
[52] U.S. Cl. .................. 310/154; 310/40 MM
[58] Field of Search ........... 310/154, 40 MM, 46, 310/66, 67 R, 152

[56] References Cited

U.S. PATENT DOCUMENTS

| | | | |
|---|---|---|---|
| 3,064,150 | 11/1962 | Barnes | 310/154 |
| 3,083,310 | 3/1963 | Tweedy et al. | |
| 3,564,705 | 2/1971 | Cochardt | 29/596 |
| 4,237,397 | 12/1980 | Mohr et al. | 310/154 |
| 4,464,595 | 8/1984 | Hamano et al. | 310/154 |
| 4,687,608 | 8/1987 | Eino | 310/154 |
| 4,727,273 | 2/1988 | Tanaka | 310/154 |
| 4,794,291 | 12/1988 | Abukawa et al. | 310/154 |
| 4,896,065 | 1/1990 | Tsuyama | 310/154 |
| 4,945,330 | 7/1990 | Arita | 335/229 |
| 4,973,871 | 11/1990 | Bisantz | 310/154 |
| 4,994,702 | 2/1991 | Arita | 310/254 |
| 5,004,944 | 4/1991 | Fisher | 310/266 |
| 5,008,578 | 4/1991 | Pace | 310/256 |

*Primary Examiner*—Steven L. Stephan
*Assistant Examiner*—Matthew Nguyen
*Attorney, Agent, or Firm*—McGlew and Tuttle

[57] ABSTRACT

A field magnet for miniature motors of a type having a stator comprising a field magnet fixedly fitted to a motor housing, an end plate fitted to an open end of the motor housing; an a rotor comprising a rotor winding wound on a rotor core; electric current being fed to the rotor winding via a commutator making sliding contact with current feeding brushes that are held by brush holders fixedly fitted to the end plate; in which cogging during motor rotation is reduced to make motor rotation smooth by forming a magnet that has at the magnetic poles thereof higher maximum magnetic energy product than any other regions.

4 Claims, 3 Drawing Sheets

FIELD MAGNET FOR MINIATURE MOTORS

This is a continuation-in-part application of U.S. application Ser. No. 07/572,001, now U.S. Pat. No. 5,162,684 filed Aug. 23,1990.

BACKGROUND OF THE INVENTION

This invention relates generally to a field magnet for miniature motors in which a afield is formed by fixedly fitting a magnet to a motor housing, and more particularly to a field magnet for miniature motors that has been improved so as to make motor rotation smooth by reducing cogging during motor rotation.

DESCRIPTION OF THE PRIOR ART

In recent years, miniature motors are widely used as prime movers for various types of equipment, and the demand for smaller size and more smooth rotation with miniature motors is becoming increasingly strong. It is well known that in reducing the size of miniature motors and making motor rotation smooth, the shape of the field magnet is an important factor.

FIG. 1 is a partially longitudinal sectional front view of a miniature motor of the prior art to which this invention is directed. In FIG. 1, reference numeral 22 refers to a motor housing, formed into a hollow cylindrical cup shape to the inner circumferential surface of which field magnets 21 are fixedly fitted. Numeral 11 refers to an end plate fitted to an open end of the motor housing 22; 17 to a motor shaft, to which a rotor core 18 and a commutator 13 are fitted, rotatably supported by bearings 15 and 16 provided on the motor housing 22 and the end plate 11. 19 refers to a rotor winding wound o the rotor core 18. 12 refers to terminals held by the end plate 11. 14 refers to brushes electrically connected to the terminals 12 and formed in such a manner to make sliding contact with the commutator 13.

With the aforementioned arrangement, the rotor 23 placed in a field formed by the field magnets 21 fixedly fitted to the inner circumferential surface of the motor housing 22 is caused to rotate as electric current is fed to the rotor winding 19 from the terminals 12 via the brushes 14 and the commutator 13.

FIG. 2 is a side view of the essential part of the miniature motor shown in FIG. 1, with the end plate 11 removed. FIG. 3 is a perspective view illustrating the field magnet shown in FIG. 2. Like parts are indicated by like reference numerals shown in FIG. 1. As shown in FIGS. 2 and 3, the field magnet 21 is formed into an arc-shaped segment, with the intermediate part thereof made thicker than both side edges By changing the magnet thickness at varied locations in this way, cogging can be reduced. With the recent trend toward making motor size smaller, the field magnet 21 also naturally becomes smaller and thinner. Making the field magnet too thin, however, it would become difficult to make the intermediate part of the field magnet thicker than both side edges.

FIGS. 4 and 5 are perspective views showing improved field magnets of the prior art. FIG. 4 shows an arc-shaped field magnet 24 having an even thicknes, with the four corners thereof substantially cut off, as proposed in Published Unexamined Patent Publication No. 166757/1987. Even with a field magnet that is too thin to make thickness uneven, the same effects as the field magnet 21 having varied thicknesses, as shown in FIG. 2, can be achieved by cutting off the four corners thereof.

Next, the field magnet 25 shown in FIG. 5 is an example of the prior-art magnet, whose thickness is changed, as shown in FIGS. 2 and 3, and the four corners thereof are also cut off by applying the aforementioned proposal.

In general, field magnets for miniature motors are of a segment shape and of a cylindrical shape. The above-mentioned proposal (as shown in FIGS. 4 and 5) has been applied to the segment type field magnet, but it is difficult to apply this technique to field magnets of a cylindrical shape.

As noted earlier, field magnets for miniature motors are generally fixedly fitted to the inner circumferential surface of a motor housing. In the magnet of the aforementioned proposal whose four corners are cut off into a rhombic shape, however, it is difficult to use such simple fixing means as fixing the magnet with a pin made of a resilient material, for example.

SUMMARY OF THE INVENTION

It is the first object of this invention to provide a field magnet for miniature motors that can reduce cogging torque.

It is the second object of this invention to provide a field magnet in which the use of materials for the field magnet is reduced to accomplish cost reduction.

It is the third object of this invention to provide a field magnet to which the conventional fixing means can be applied.

BRIEF DESCRIPTION OF THE DRAWINGS

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE EMBODIMENTS

FIGS. 6 through 13 are perspective views illustrating embodiments of this invention. In the figure, numeral 1 refers to a magnetic-pole portion; 2 to an intermediate portion; 3 to a cutout portion; and 4 to a necked portion, and arrows denote magnetizing direction.

Figure 6:
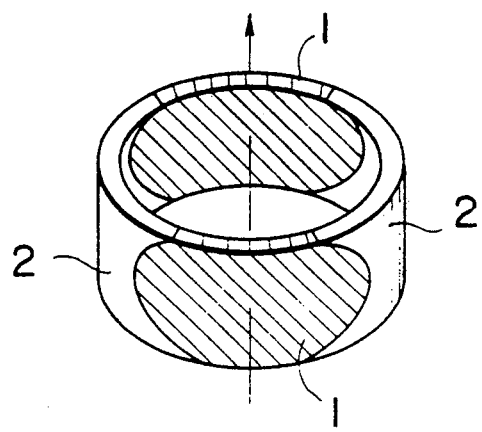
FIGS. 6 through 13 are perspective views illustrating embodiments of this invention.
Figure 7:
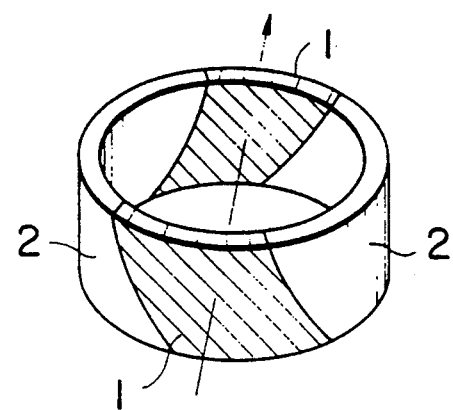
Figure 8:
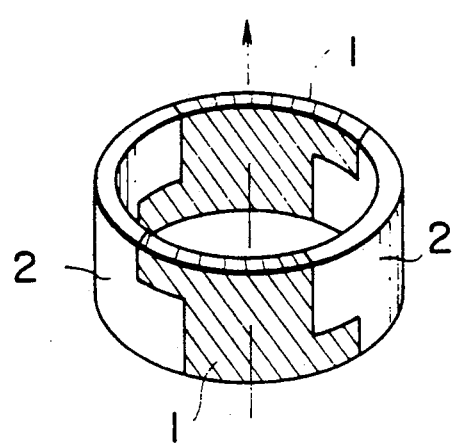
Figure 9:
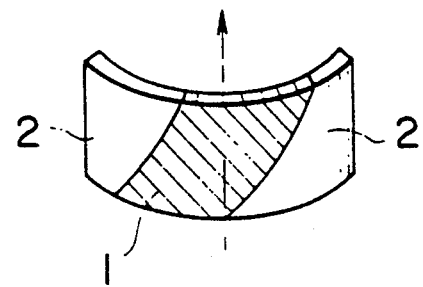
Figure 10:
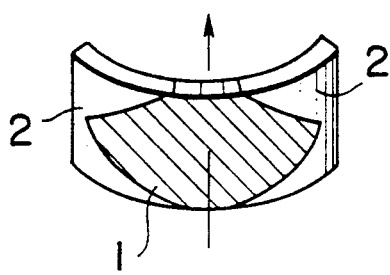

FIGS. 6 through 10 shows field magnets for miniature motors embodying this invention, which are formed by injection-molding two dissimilar magnetic materials having different maximum magnetic energy products, with FIGS. 6 through 8 showing cylindrical magnets, and FIGS. 9 and 10 showing segment-shaped magnets. In FIGS. 6 through 10, the magnetic-pole portion 1 is indicated by hatching, though it is not a sectional portion.

In FIGS. 6 through 10, the magnetic pole 1 is made of a resin magnet obtained by bonding a rare-earth magnetic material having high maximum magnetic energy product (such as samarium-cobalt, neodymium-iron-boron, etc.) with a resin, with the intermediate portion 2 made of a resin magnet obtained by bonding an oxide magnetic material having low maximum magnetic energy product (such as strontium-ferrite, etc.) with a resin. The intermediate portion 2 may be made of a resin alone.

Figure 1:
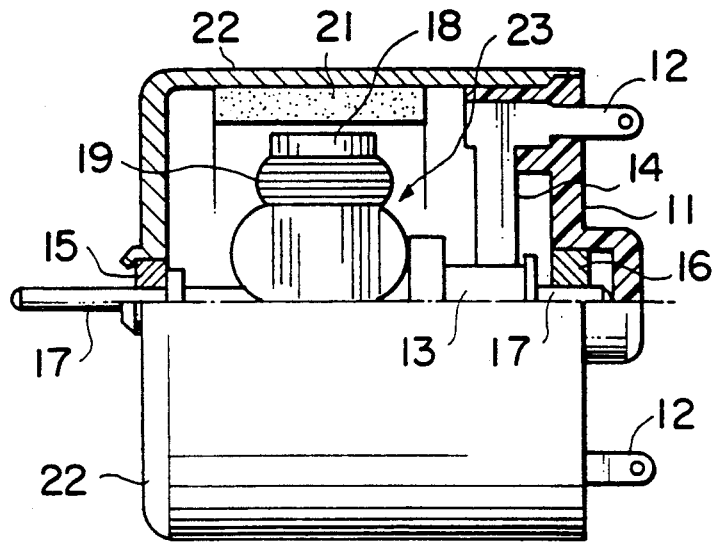
FIG. 1 is a partially longitudinal sectional front view illustrating a miniature motor of the prior art to which this invention is directed.
Figure 2:
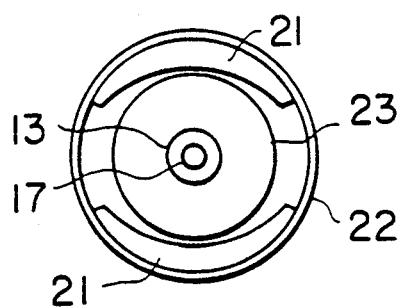
FIG. 2 is a side view of the essential part of the miniature motor shown in FIG. 1, with the end plate thereof removed.
Figure 3:
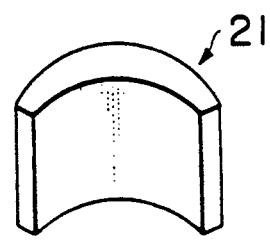
FIG. 3 is a perspective view illustrating the field magnet shown in FIG. 2.
Figure 4:
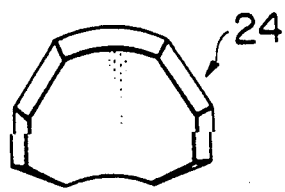
FIGS. 4 and 5 are perspective views illustrating improved field magnets of the prior art, respectively.
Figure 5:
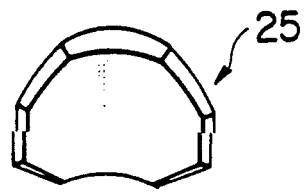

In the embodiments shown in FIGS. 6 through 10, the magnetic-pole portion 1 as a main magnetic flux generating portion is made of a magnet having high magnetic energy product, and the intermediate portion 2 is made of a magnet having low magnetic energy product, or a resin. This helps reduce the thickness of field magnets for miniature motors, which is an important factor in reducing the size of miniature motors. In addition, since the consumption of expensive rare-earth magnetic materials can be reduced inexpensive field magnets for miniature motors having low cogging torque can result. In the cylindrical field magnets (as shown in FIGS. 6 through 8), cogging torque can be reduced. In the segment-shaped field magnets as shown in FIGS. 9 and 10, the magnets can be formed into the same shape as that of the conventional segment-shaped field magnets, instead of the rhombic shape as in the prior-art shown in FIGS. 4 and 5. This enables the conventional fixing means to be used as it is.

Figure 11:
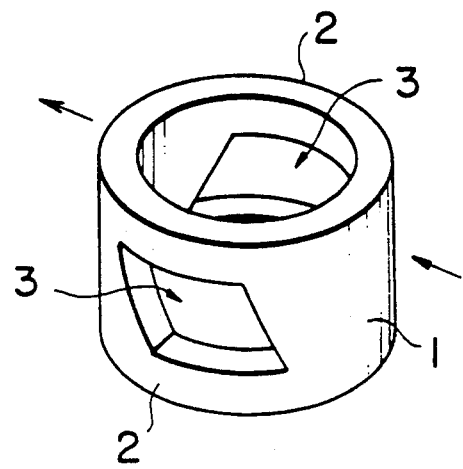
Figure 12:
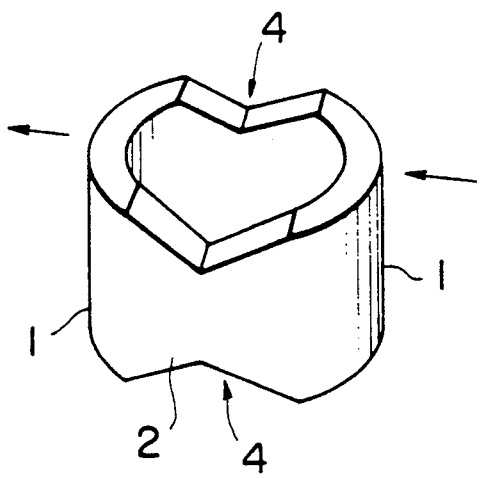
Figure 13:
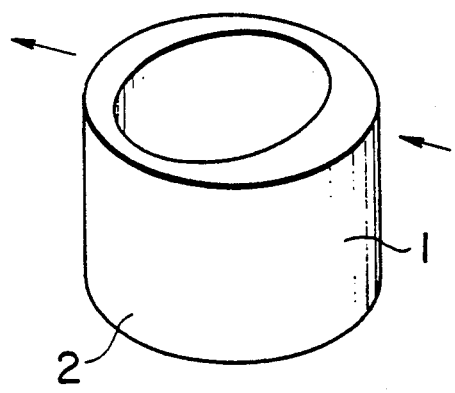

The embodiments shown in FIGS. 11 through 13 are field magnets according to this invention manufactured by forming and sintering a rare-earth magnetic material (such as samarium-cobalt, neodymium-iron-boron, etc.) or a ferrite material (such as strontium-ferrite, barium-ferrite, etc.) or bonding these materials into an integral and cylindrical shape with a resin. The embodiment shown in FIG. 11 is intended to reduce cogging torque by providing a cutout portion 3 of rhombic shape on the intermediate portion 2. The embodiment shown in FIG. 12 is intended to reduce cogging torque by providing a necked portion 4 by providing V-notches on both sides of the intermediate portion 2. The shapes of the cutout portion 3 and the necked portion 4 are not limited to the rhombic and V shapes as shown in FIGS. 11 and 12, but rectangular, circular or any other shapes may be used.

In the embodiments shown in FIGS. 11 and 12, provision of the cutout portion or the necked portion 4 makes it possible not only to reduce cogging torque but also to reduce material consumption, leading to cost reduction.

Furthermore, FIG. 13 shows an embodiment of the field magnet for miniature motors of this invention, which is of a cylindrical shape, and yet whose thickness is changed at different locations.

As described above, this invention makes it possible to provide a field magnet for miniature motors that can reduce cogging torque whether the field magnet is of a segment type or of a cylindrical type. The field magnet of this invention, furthermore, can reduce the consumption of materials, leading to cost reduction. In addition, even the segment type field magnet of this invention can be formed into the same shape as that of the conventional field magnets, with the result that the field magnet can be easily fitted using the conventional fixing means.

While specific embodiments of the invention have been shown and described in detail to illustrate the application of the principles of the invention, it will be understood that the invention may be embodied otherwise without departing from such principles.

What is claimed is:

1. A field magnet for miniature motor of a type having a stator comprising a field magnet fixedly fitted to a motor housing; an end plate mounted on an open end of said motor housing; a rotor comprising a rotor winding wound on a rotor core; electric current being fed to said rotor winding via a commutator making sliding contact with current feeding brushes held by brush holders fixedly fitted to an end plate, said field magnet being formed as an arc shaped segment with a rotor facing surface and an opposite surface, said shaped segment being formed of two different material portions including a central first material portion of a non-rectangular shape extending from said rotor facing surface of the segment to said opposite surface of the segment, said central portion being formed of a material having a high magnetic energy product and an outer second material portion forming another region of second segment on each side of said central first material portion said outer second material portion, comprising a remainder of said segment, formed of a material having a low magnetic energy product.

2. A field magnet for miniature motors of a type having a stator comprising a field magnet fixedly fitted to a motor housing; an end plate mounted on an open end of said motor housing; a rotor comprising a rotor winding wound on a rotor core; electric current being fed to said rotor winding via a commutator making sliding contact with current feeding brushes held by brush holders fixedly fitted to said end plate, said field magnet comprising of an arc-shaped segment with a rotor facing segment face and an opposite segment face, said arc-shaped segment being formed of two material portions including a non-rectangularly shaped central material portion extending from one segment face to another segment face, and said arc-shaped segment also including another material portion, forming a remaining part of said segment, said central material portion being formed of a material having a high magnetic energy product and said remaining portion being formed of resin.

3. A field magnet for miniature motors of a type having a stator comprising a field magnet fixedly fitted to a motor housing; an end plate mounted on an open end of said motor housing; a rotor comprising a rotor winding wound on a rotor core; electric current being fed to said rotor winding via a commutator making sliding contact with current feeding brushes held by brush holders fixedly fitted to said end plate, said field magnet being formed as a cylindrical element including a first material wall portion and an opposite second material wall portion to form a central part of magnetic pole portions provided on said cylindrical element, said central part of said magnetic pole portions being formed as two non-rectangular opposite shaped regions of material having a high magnetic energy product, a remaining region, on each side of said non-rectangular opposite shaped region, being provided formed of a material having a low magnetic product.

4. A filed magnet for miniature motors of a type having a stator comprising a field magnet fixedly fitted to a motor housing; an end plate mounted on an open end of said motor housing; a rotor comprising a rotor winding wound on a rotor core; electric current being fed to said rotor winding via a commutator making sliding contact with current feeding brushes held by brush holders fixedly fitted to said end plate, said field magnet being formed as a cylindrical shaped element having a cylindrical wall with opposite wall portions forming magnetic pole portions having a high magnetic energy product as opposite non-rectangularly shaped material regions, said cylindrical shaped element having a remaining portion, on each side of said non-rectangularly shaped material regions, formed of resin.

* * * * *